United States Patent
Feng et al.

(10) Patent No.: US 10,832,471 B2
(45) Date of Patent: Nov. 10, 2020

(54) FAST T-SPLINE FITTING SYSTEM AND METHOD

(71) Applicant: Mitsubishi Electric Research Laboratories, Inc., Cambridge, MA (US)

(72) Inventors: Chen Feng, Cambridge, MA (US); Yuichi Taguchi, Arlington, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 0 days.

(21) Appl. No.: 15/469,840

(22) Filed: Mar. 27, 2017

(65) Prior Publication Data

US 2018/0276884 A1 Sep. 27, 2018

(51) Int. Cl.
*G06T 17/20* (2006.01)
*G06T 17/30* (2006.01)

(52) U.S. Cl.
CPC .............. *G06T 17/20* (2013.01); *G06T 17/30* (2013.01); *G06T 2210/56* (2013.01)

(58) Field of Classification Search
CPC ...... G06T 17/20; G06T 17/30; G06T 2210/56
USPC ........................................................ 345/423
See application file for complete search history.

(56) References Cited

U.S. PATENT DOCUMENTS

| | | | |
|---|---|---|---|
| 7,274,364 B2 * | 9/2007 | Sederberg | G06F 17/50 345/420 |
| 8,004,517 B1 * | 8/2011 | Edelsbrunner | G06T 17/20 345/419 |
| 8,310,481 B2 | 11/2012 | Bailey | |
| 9,796,089 B2 * | 10/2017 | Lawrence, III | B25J 9/1671 |
| 2007/0018988 A1 * | 1/2007 | Guthe | G06T 11/20 345/441 |
| 2007/0052706 A1 * | 3/2007 | Martin | G06T 17/20 345/423 |
| 2007/0247458 A1 * | 10/2007 | Surazhsky | G06T 17/20 345/423 |

(Continued)

FOREIGN PATENT DOCUMENTS

WO 2004088468 A2 10/2004

OTHER PUBLICATIONS

Zheng et al. "Adaptive T-Spline Surface Fitting to Z-Map models", 2005 ACM.*

(Continued)

*Primary Examiner* — Chong Wu
(74) *Attorney, Agent, or Firm* — Gennadiy Vinokur; James McAleenan; Hironori Tsukamoto

(57) ABSTRACT

A first T-spline fitting system includes a three-dimensional (3D) sensor, a processor and a memory storing a program for representing a point cloud of the scene using T-spline representation. The system executes acquiring an image of the scene using the 3D sensor, generating the point cloud from the image, determining a parameterized domain of the point cloud by mapping data points of the point cloud to values of parameters of the parameterized domain, partitioning recursively the parameterized domain into a set of patches, connecting the patches to form a T-mesh defining topology of control points in the parameterized domain, and fitting a T-spline surface into the point cloud according to the T-mesh to determine positions of the control points.

19 Claims, 11 Drawing Sheets

(56) References Cited

U.S. PATENT DOCUMENTS

| | | | | |
|---|---|---|---|---|
| 2009/0024370 | A1* | 1/2009 | Scott | G06F 17/5018 |
| | | | | 703/2 |
| 2009/0237399 | A1* | 9/2009 | Bailey | G06T 17/20 |
| | | | | 345/420 |
| 2012/0191423 | A1* | 7/2012 | Dokken | G06T 17/30 |
| | | | | 703/1 |
| 2013/0031442 | A1* | 1/2013 | Rawlins | H03F 1/0211 |
| | | | | 714/763 |
| 2014/0184599 | A1* | 7/2014 | Quilot | G06T 17/20 |
| | | | | 345/423 |
| 2016/0005221 | A1* | 1/2016 | Morwald | G06T 17/30 |
| | | | | 348/222.1 |
| 2016/0163083 | A1* | 6/2016 | Barmpoutis | G06T 13/40 |
| | | | | 345/419 |
| 2017/0004649 | A1* | 1/2017 | Collet Romea | G06T 15/205 |
| 2017/0018118 | A1* | 1/2017 | Li | G06F 17/5018 |
| 2017/0177745 | A1* | 6/2017 | Sheng | G06F 17/50 |
| 2018/0225871 | A1* | 8/2018 | Suresh | G06T 17/30 |
| 2018/0253909 | A1* | 9/2018 | Chen | G06T 7/337 |

OTHER PUBLICATIONS

Morwald et al., Direct Optimization of T-Spline Based on Multiview Stereo, 2014 2nd International Conference on 3D Vision, IEEE, vol. 1, Dec. 8, 2014, pp. 20-27.

Jianmin Zheng et al., Adaptive T-spline surface fitting to z-map models, Computer Graphics and Interactive Techniques in Australasia and South East Asia, ACM, 2 Penn Plaza, Suite 701, New York, NY, USA.. Nov. 29, 2005, pp. 405-411.

* cited by examiner

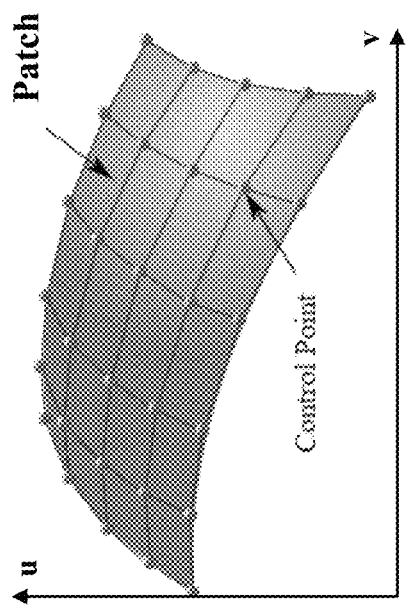
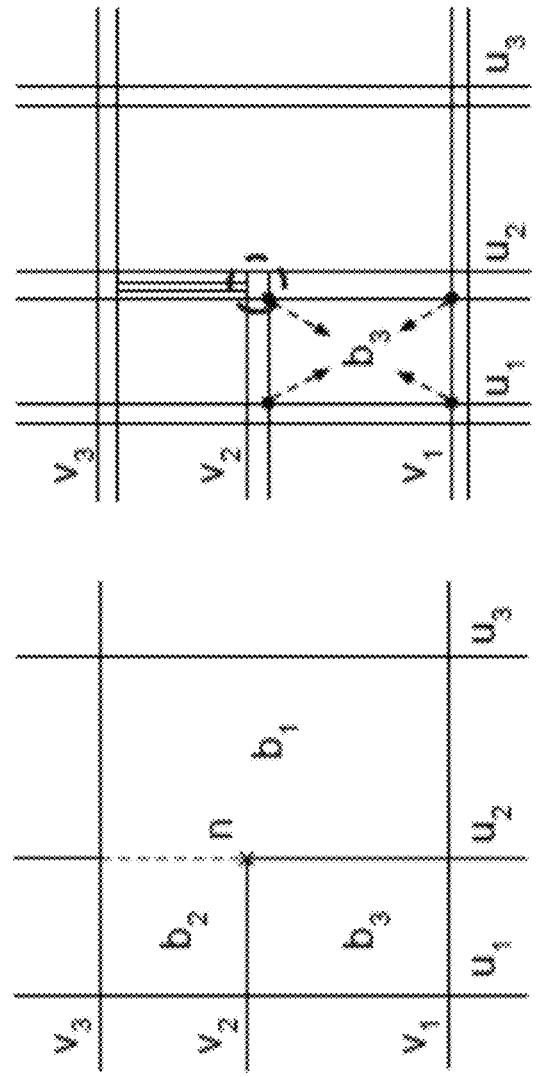
FIG. 2A
FIG. 2B
FIG. 2C

FAST T-SPLINE FITTING SYSTEM AND METHOD

FIELD OF THE INVENTION

This invention relates to a system and method for rapidly representing a set of three dimensional (3D) points of a scene, and more specifically to a system and method for representing a set of 3D points of a scene using fast T-spline fitting.

BACKGROUND OF THE INVENTION

T-spline is used to represent objects of arbitrary shapes using much smaller number of control points compared to the classical non-uniform rational bases spline (NURBS) or bases spline (B-spline) representations in computer aided design, computer graphics, and reverse engineering.

Conventional T-spline fitting algorithms usually approximate an input point cloud starting from a simple B-spline or Bézier surface. Then the control mesh is locally refined at places with large fitting errors by inserting more control points into the mesh. After the mesh refinement, all input data points are used again to refine a new set of control points. This means that at each mesh refinement iteration, every single data point will be accessed for a new least squares fitting. For large sized point clouds with many fine details, such mesh refinement and least squares fitting have to be performed many times so as to achieve a reasonable balance between a high fitting accuracy and a small number of control points. It is difficult for such conventional T-spline fitting strategy to achieve fast computation.

Accordingly, using existing methods to fit a T-spline over a point cloud is slow, because T-spline control points have to be fitted with all data points at once, which is computationally expensive.

For instance, a method for capturing images is described in US20160005221 A1, however, that method requires more computational time. Therefore, there is a need for a system and method that can provide fast T-spline fitting for representing a set of 3D points of a scene.

SUMMARY OF THE INVENTION

Some embodiments are based on recognition and appreciation of the fact that a T-spline surface is efficiently fitted to a 2D parameterized point cloud by a fast T-spline fitting algorithm.

According to embodiments of the present invention, a system for representing a point cloud of a scene using T-spline representation includes a three-dimensional (3D) sensor configured to acquire images of the scene; a processor configured to communicate the 3D sensor and a memory storing a program for representing a point cloud of the scene using T-spline representation and execute instructions of the program, the instructions comprises steps of acquiring an image of the scene using the 3D sensor; generating the point cloud from the image; determining a parameterized domain of the point cloud by mapping data points of the point cloud to values of parameters of the parameterized domain; partitioning recursively, until a termination condition meets a threshold condition, the parameterized domain and the mapped data points of the point cloud into a set of patches, wherein a current partitioning includes fitting a spline surface into a portion of the point cloud corresponding to a patch formed by a previous partitioning and partitioning the patch further; connecting the patches to form a T-mesh defining topology of control points in the parameterized domain; and fitting a T-spline surface into the point cloud according to the T-mesh to determine positions of the control points.

Another embodiment of the present invention provides a method for representing a point cloud of a scene using T-spline representation using a processor in communication with a memory and a three-dimensional sensor includes acquiring an image of the scene using the 3D sensor; generating the point cloud from the image; determining a parameterized domain of the point cloud by mapping data points of the point cloud to values of parameters of the parameterized domain; partitioning recursively, until a termination condition meets a threshold condition, the parameterized domain and the mapped data points of the point cloud into a set of patches, wherein a current partitioning includes fitting a spline surface into a portion of the point cloud corresponding to a patch formed by a previous partitioning and partitioning the patch further; connecting the patches to form a T-mesh defining topology of control points in the parameterized domain; and fitting a T-spline surface into the point cloud according to the T-mesh to determine positions of the control points.

Further, another embodiment discloses a non-transitory computer readable recoding medium storing thereon program codes causing a processor to execute a method for representing a point cloud of a scene using T-spline representation, wherein the program codes include program code acquiring an image of the scene using the 3D sensor; program code for generating the point cloud from the image; program code for determining a parameterized domain of the point cloud by mapping data points of the point cloud to values of parameters of the parameterized domain; program code for partitioning recursively, until a termination condition meets a threshold condition, the parameterized domain and the mapped data points of the point cloud into a set of patches, wherein a current partitioning includes fitting a spline surface into a portion of the point cloud corresponding to a patch formed by a previous partitioning and partitioning the patch further; program code for connecting the patches to form a T-mesh defining topology of control points in the parameterized domain; and fitting a T-spline surface into the point cloud according to the T-mesh to determine positions of the control points.

According to embodiments of the present disclosure, the system and method for representing a point cloud of a scene using T-spline representation according to embodiments of the present disclosure can remarkably reduce the computational costs and improve data processing of images in a scene objects using a computer.

Further, according to embodiments of the present disclosure, the algorithms of programs stored in a memory or a computer readable recording medium in connection with a processor can reduce control processing unit usage and power consumption of the processor.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIG. 2A is an illustration representing control points computed for Bézier patches;

FIG. 2B and FIG. 2C are illustrations representing six junctions inside a dashed circle corresponding to vertex n;

Figure 1A:
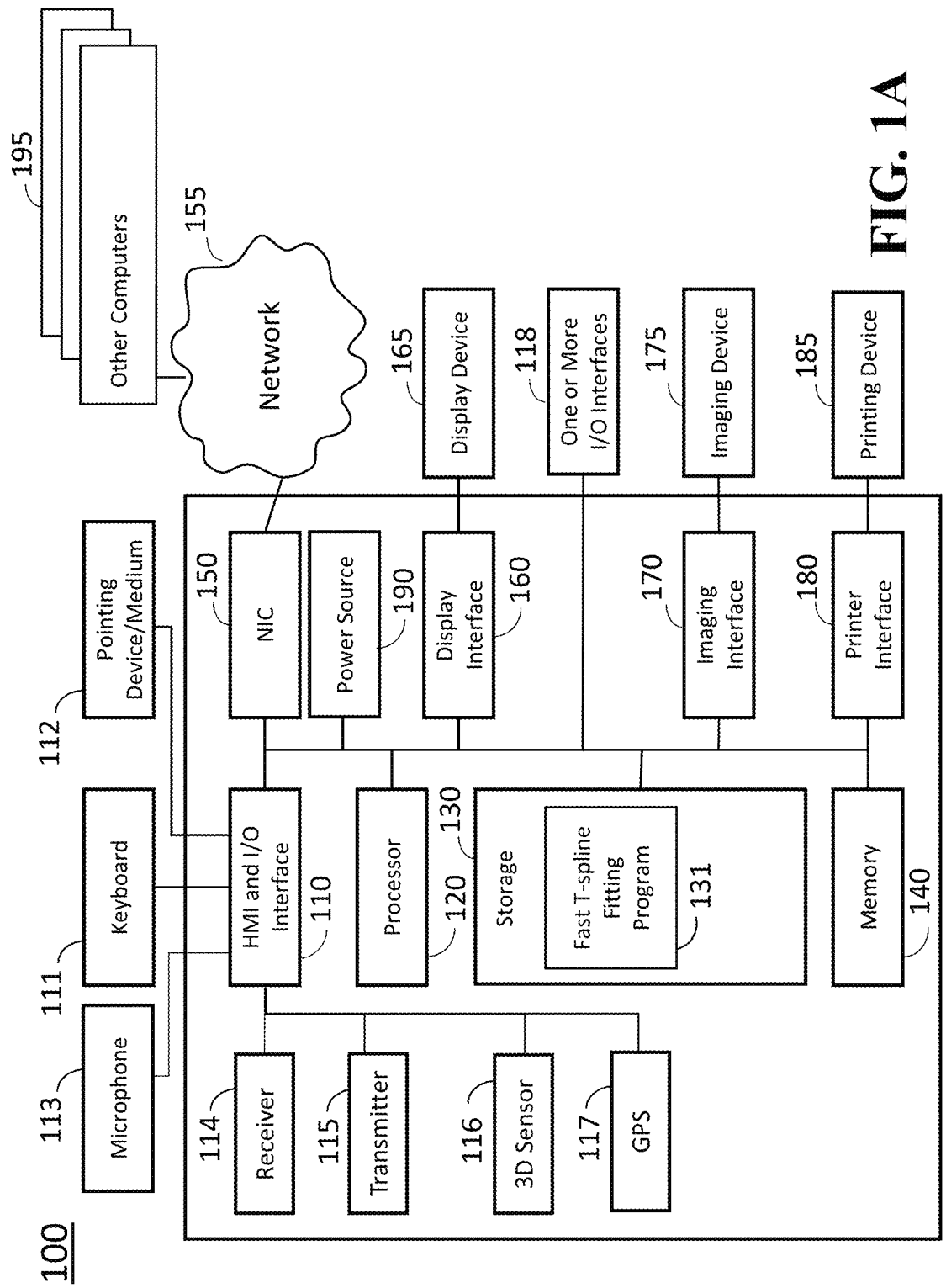
FIG. 1A is a block diagram illustrating a fast T-spline fitting system according to embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION OF THE PREFERRED EMBODIMENTS

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks. The present invention improves upon prior art fitting systems by employing a fast T-spline fitting.

FIG. 1A is a block diagram illustrating a fast T-spline fitting system 100 according to embodiments of the present disclosure. The fast T-spline fitting system 100 can include a human machine interface (HMI) with input/output (I/O) interface 110 connectable with a keyboard 111 and a pointing device/medium 112, a microphone 113, a receiver 114, a transmitter 115, a 3D sensor 116, a global positioning system (GPS) 117, one or more I/O interfaces 118, a processor 120, a storage device 130, a memory 140, a network interface controller 150 (NIC) connectable with a network 155 including local area networks and internet network (not shown), a display interface 160 connected to a display device 165, an imaging interface 170 connectable with an imaging device 175, a printer interface 180 connectable with a printing device 185. The HMI with I/O interface 110 may include analog/digital and digital/analog converters. The HMI with I/O interface 110 includes a wireless communication interface that can communicate with other fast T-spline fitting systems or other computers via wireless internet connections or wireless local area networks, which enable to complete multiple 3D point clouds. The fast T-spline fitting system 100 can include a power source 190. The power source 190 may be a battery rechargeable from an external power source (not shown) via the I/O interface 118. Depending upon the application the power source 190 may be optionally located outside of the system 100. The HMI and I/O interface 110 and the I/O interfaces 118 can be adapted to connect to another display device (not shown) including a computer monitor, camera, television, projector, or mobile device, among others.

The first T-spline fitting system 100 can receive electric text/imaging documents including speech data via the network 155 connected to the NIC 150. The storage device 130 includes a fast T-spline fitting program 131, in which algorithms of the program 131 are stored into the storage 130 as code data being executed by the processor 120 according to the code data (algorithms or instructions of the program). The program 131 may be stored to a computer readable recording medium (not shown) so that the processor 120 can execute the fast T-spline fitting program by loading the algorithms of the program from the medium using the memory 140. Further, the pointing device/medium 112 may include a data processing device that read programs stored on a computer readable recording medium.

In order to start acquiring a 3D point cloud of a scene using the 3D sensor 116, instructions may be transmitted to the system 100 using the keyboard 111, the pointing device/medium 112 or via the wireless network or the network 190 connected to other computers 195. The acquiring of the 3D point cloud may be started in response to receiving an acoustic signal of a user via the microphone 113 using pre-installed conventional speech recognition program stored in the storage 130. Further, the first T-spline fitting system 100 can receive data of a 3D point cloud via the network 155 from other computers 195 and perform first T-spline fitting using the received data of the 3D point cloud. The system 100 may transmit the resulted data of the fast T-spline fitting process via the network 155 to the other computers 195.

The processor 120 may be a plurality of processors including one or more graphics processing units (GPUs). The storage 130 may include speech recognition algorithms (not shown) that can be executed by the processor 120 to recognize speech signals obtained via the microphone 113.

The processor 120 executes the instructions of the program 131 stored in the storage 130 in communication with the memory 140. The 3D sensor 116 acquires data of a scene and transmits the data of the images to the memory 140 via the I/O interface 110. The processor 120 generates a 3D point cloud of the scene from the data of the images in the memory 140. From the 3D point cloud, the processor 120 determines a parameterized domain of the point cloud by mapping data points of the point cloud to values of parameters of the parameterized domain. Further, the processor 120 partitions the parameterized domain and the mapped data points of the point cloud into a set of patches recursively until a termination condition is met. In this case, a current partitioning includes fitting a spline surface into a portion of the point cloud corresponding to a patch formed by a previous partitioning and partitioning the patch further when an error of the fitting is greater than a threshold (error value). The threshold may be preliminary determined. For instance, the threshold may be determined by an area of the portion of the point cloud or a predetermined fitting error value. In this case, a fitting error of each of the patches is determined independently from fitting errors of other patches of the parameterized domain. A fitting error value may be referred to as a fitting error. Further, a fitting error of each of the patches may be determined independently from fitting errors of other patches of the parameterized domain.

In some cases, the threshold may be automatically determined based on a predetermined data size of the images. The threshold may be data dependent and be determined according to the context of data to be used. Further, the processor 120 performs connections of the patches to form a T-mesh defining topology of control points in the parametric domain and fits a T-spline surface into the point cloud according to the T-mesh to determine positions of the control points.

In some cases, each of the patches may be a rectangular sub-patch in the parameterized domain. Further, the partitioning process may divide the parameterized domain either uniformly or non-uniformly into the set of patches.

In some examples, the threshold condition may be defined by a predetermined fitting error value for a spline fitted for data points in a patch. In another case, the threshold condition may be defined by a predetermined data size of the images.

Further, the data of the fitted T-spline surface can be transmitted to a display device or another computer. In this case, the display device can display the T-spline surface and T-mesh on a screen of the display device.

Figure 1B:
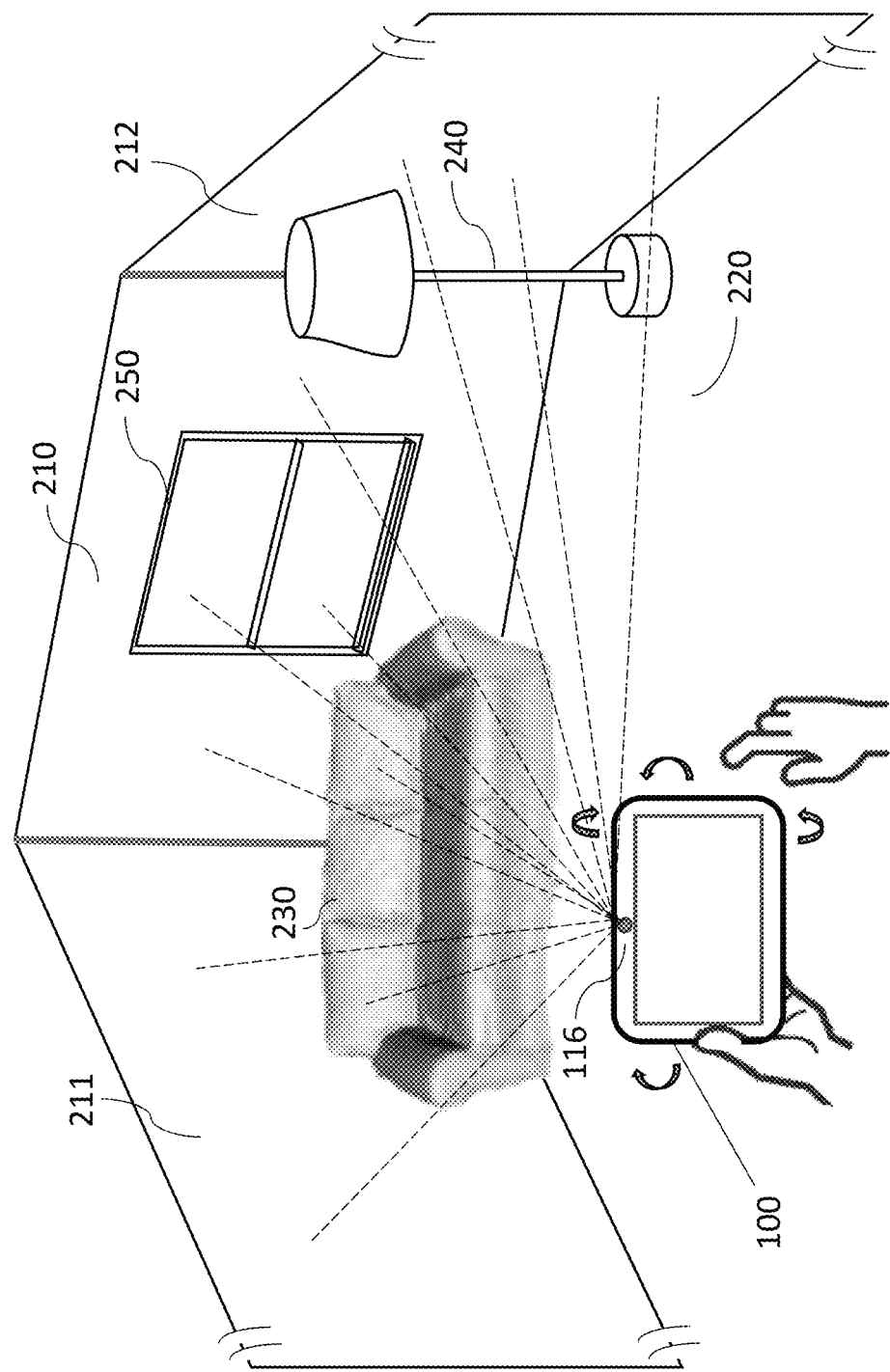
FIG. 1B is an example illustration of acquiring a 3D point cloud using a 3D sensor.

Point Cloud Acquisition Process FIG. 1B is an example illustration of acquiring a 3D point cloud using a 3D sensor 116 of the fast T-spline fitting system 100 according to embodiments of the present disclosure. In this case, the fast T-spline fitting system 100 scans point data of objects in a room, including a front wall 210, a left wall 211, a right wall 212, a floor 220, a ceiling (not shown), a sofa 230, a lamp 240, and a window 250.

The 3D sensor 116 acquires the point data of objects, which include a set of 3D points measured on surfaces of the objects, and the point data are stored into the memory 140 or the storage 130. Data processing is performed for the point data using the processor 120 according to the fast T-spline fitting program 131. Typically, the set of 3D points are acquired as a 2D image indicated by pixels, known as a depth image, where each pixel includes a distance measurement (distance value) to a 3D point on a surface of an object located along a direction of a ray defined by the pixel. For each pixel, the direction of the ray corresponding to the pixel can be recovered by back-projecting the pixel using internal calibration parameters of the 3D sensor 116, and the 3D point can be recovered on the ray at a 3D location whose distance from the 3D sensor 116 is given by the distance measurement.

In one embodiment of the present disclosure, the 3D point cloud is generated by placing the 3D sensor 116 at a fixed pose. A pose of the 3D sensor 116 includes 3 degree-of-freedom translation (position) and 3 degree-of-freedom rotation (orientation), having a total of 6 degrees of freedom. In this case, the point data are acquired as a single frame (as a depth image) at the fixed pose, and the 3D point cloud is generated by the single frame of the point data. In another embodiment, the 3D point cloud is generated by moving the 3D sensor at different poses, acquiring multiple frames of the point data at the different poses, and registering the multiple frames with each other into a single common coordinate system (a predetermined coordinate system). Such registration can be done by using simultaneous localization and mapping (SLAM) techniques as known in the art.

It is assumed that the input point clouds have been fixedly parameterized by using the depth image row-column indices. If the fast computation is not necessary for any downstream application, our fast T-spline fitting strategy can still work with the any better parameterization method, and producing potentially better fitting results that has fewer control points. Yet since most other parameterizations are time consuming, it is reasonable to bear with slightly more control points in trade of much faster computations. Accordingly, some embodiments of the present disclosure can reduce control processing unit usage and power consumption, which also improve the functions of the computer.

FIG. 2A is an illustration of a sheet surface on a u-v coordinate, where the sheet is represented by control points and patches. FIGS. 2B and 2C show examples of local knot vector inferences for d=3. Three Bézier patches (b1; b2; b3) are connected to generate a single T-mesh with prescribed surface continuity of $C_1$. Each patch boundary is classified into continuous (solid lines) or discontinuous (dashed line) according to the data, which is used to determine the knot multiplicities (the number of duplicated knot lines) in the index/parametric space. The six junctions inside the dashed circle in FIG. 2C correspond to the vertex n (cross) in FIG. 2B. The control points computed for the Bézier patches (black dots) are used to initialize those for the final T-spline.

Figure 3A:
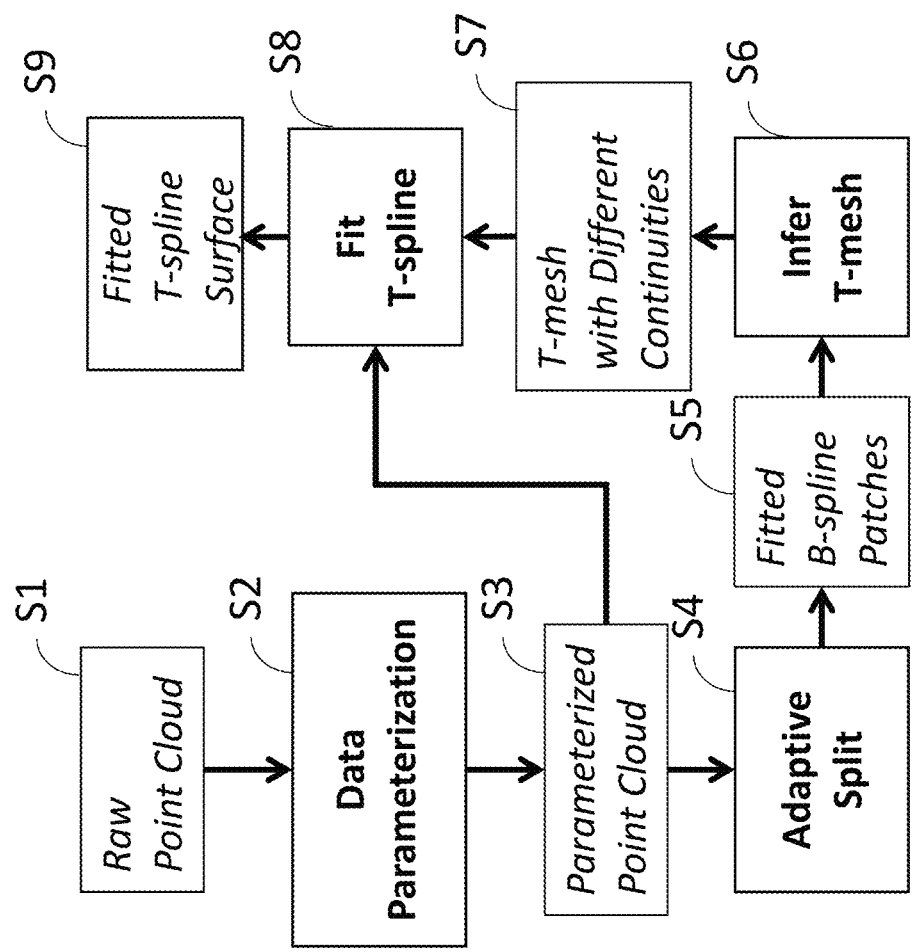
FIG. 3A is a block diagram illustrating data processing steps of a T-spline fitting process for obtaining a fitted T-spline surface from data of raw point cloud.

FIG. 3A is a block diagram illustrating data processing steps of a fast T-spline fitting process for obtaining a fitted T-spline surface from data of raw point cloud according to embodiments of the present disclosure. The T-spline fitting process includes steps of acquiring a raw point cloud (point cloud data) using the 3D sensor 116 (step S1), data parameterization (step S2) for obtaining a parameterized point cloud (step S3), adaptive splitting (step S4) for obtaining B-spline patches (step S5), inferring T-meshes based on the B-spline patches (step S6) for obtaining T-mesh with different continuities (step S7), fitting T-spline using parameterized point cloud data and T-mesh with different continuities (step S8) for obtaining a fitted T-spline surface (S9).

Figure 3B:
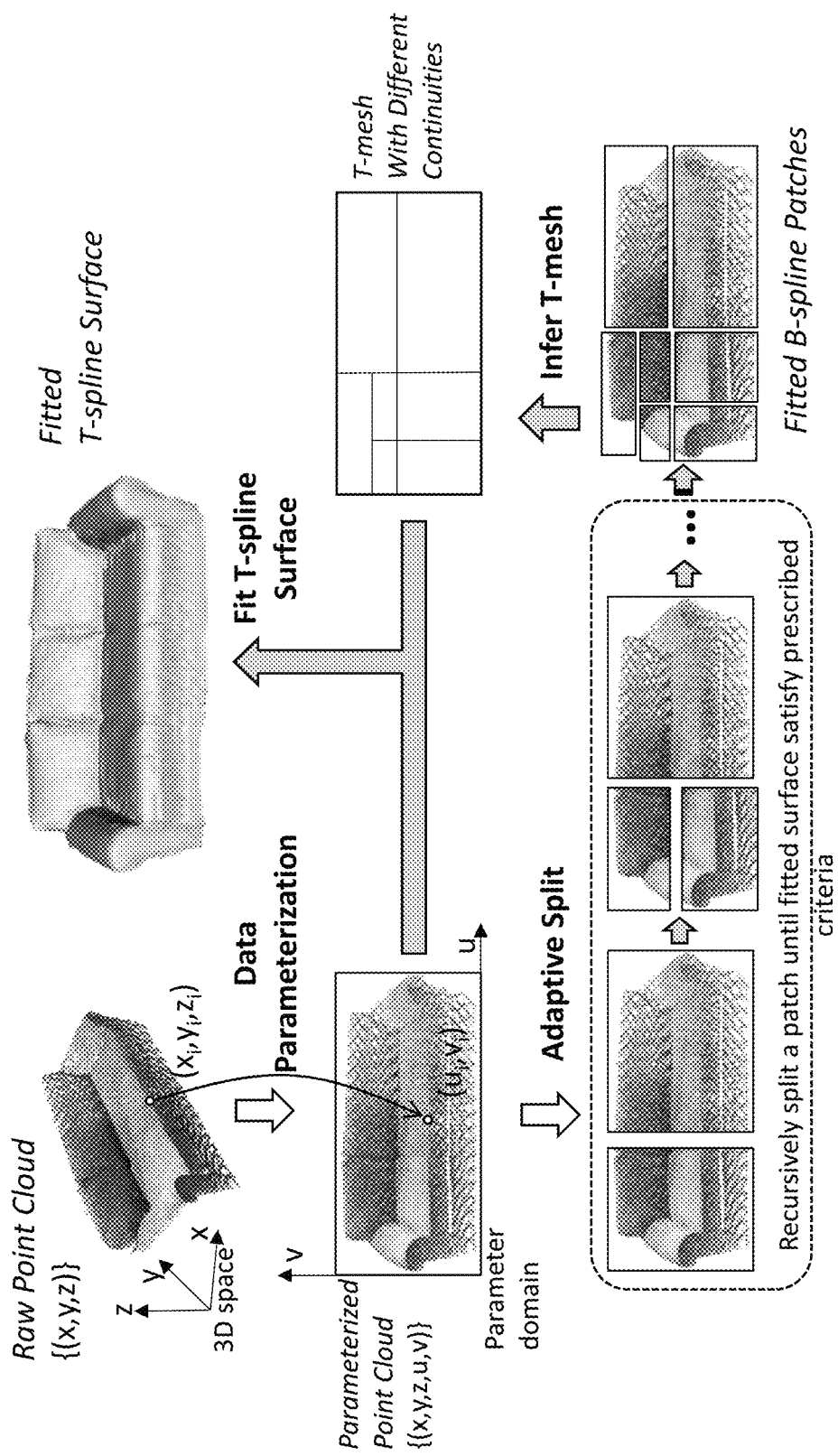
FIG. 3B shows the data processing step of the T-spline fitting using a sofa as an object according to embodiments of the present disclosure.

FIG. 3B shows the data processing of the T-spline fitting using a sofa as an object according to embodiments of the present disclosure. In this case, a raw point cloud (3D point data of the sofa) is acquired using the 3D sensor 116. Each data point of the point cloud is represented by the three dimensional space (x, y, and z axes). Data parameterization is performed with respect to the point cloud and a parameterized point cloud is obtained as a vector $\{(x, y, z, u, v)\}$, where the parameterized point cloud can be represented by a parameter domain based on points $(u_i, v_i)$ on a u-v coordinate as shown in the figure. Each step of FIG. 3A is correspondingly indicated in the figure.

B-spline and NURBS Fitting

There are two strategies for fitting B-spline or NURBS surface. The first one starts from a simple control mesh, performs global knot refinement at the area with a large fitting error (fitting error value), solves the optimal positions of all control points, updates data parameterization if necessary, and then repeats this process until the fitting error becomes small enough. The second one reverses that procedure by starting from an over-complicated mesh and iteratively simplify it by knot removal.

T-Spline Fitting

A degree of T-spline equation represents each T-spline surface point $$Q(u,v) \in R^3$$

with associated parameters u and v as a combination of all control points $C_k \in R^3$, k=1, ..., K, as follows.

$$Q(u, v) = \frac{\sum_k w_k T(u, v; U_k, V_k) C_k}{\sum_k w_k T(u, v; U_k, V_k)}, \quad (1)$$

where $U_k$ and $V_k$ are the local knot vectors in $R^{2d-1}$ associated with the k-th control points, $T: R \times R \to R$ is the T-spline blending function taking u, v as input variables and $U_k, V_k$ as function parameters, and $w_k$ are the weights for each control point.

FastFit Algorithm

An overview of a fast T-spline fitting algorithm, which is referred to as a FastFit algorithm, is described by Algorithm 1 below according to embodiments of the present disclosure.

---
Algorithm 1 Fast T-spline Fitting

1: function FASTFIT($\mathcal{F}$)
2:   B ← FITBEZIERPATCHADAPTIVE($\mathcal{F}$)
3:   (U, V, $T_{mesh}$) ← INFERLOCALKNOTVECTOR(B,$\mathcal{F}$)
4:   C ← SOLVECONTROLPOINT(B, $T_{mesh}$, U, V,$\mathcal{F}$)
5:   return (C, U, V)
---

The FastFit algorithm can include the following steps.

FitBézierPatchAdaptive: First, the input point cloud is adaptively divided (partitioned) into a set of B-spline/Bézier patches, according to a prescribed fitting error threshold. Each of these patches corresponds to a rectangular sub-domain in the input data parameter domain. In other words, each of the patches is a rectangular sub-patch in a parameterized domain. For instance, as shown in FIG. 2B and FIG. 2C, the parameterized domain may be divided non-uniformly.

InferLocalKnotVector: Second, these sub-domains are composed into a T-mesh with different connection options, depending on both a prescribed final model continuity and data continuities at shared edges of neighboring patches. This determines the number of control points and allows the inference of their corresponding local knot vectors to generate a T-mesh.

SolveControlPoint: After finding this fixed T-mesh, we finally solve a large sparse linear system for obtaining the optimal control points using PCG initialized with the Bézier patch fitting results.

Before explaining the details of each step, we focus on point clouds with fixed parameterization.

In our implementation, for an organized point cloud (either depth images or z-map data), we use a simple uniform parameterization, since many 3D sensors' raw output can be easily organized into a set of 2D indexed 3D points $F=\{p_{i,j} \in R^3; i=1, ..., M, j=1, ..., N\}$, where the 2D indices (i, j) and (i±1, j±1) reflect the 3D proximity relationship between corresponding points unless there are depth discontinuities. Thus the parameterization of each data point directly becomes its 2D index (i, j), i.e., Q(i, j) on the fitted T-spline surface from Eq. (1) corresponds to the data point $p_{i,j}$. For an unorganized point cloud F, PCA-based parameterization, i.e., $F=\{(p_i; u_i, v_i), p_i \in R^3, u_i \in R, v_i \in R; i=1, ..., M\}$ where the $(u_i, v_i)$ parameters as the input variables to Eq. (1) for each 3D point pi are obtained by projecting pi onto the plane spanned by the two eigenvectors corresponding the two largest eigenvalues. This formulation is applicable to partial regions in a parameterized point cloud, and we can optionally use pre-segmentation of an input point cloud and apply our algorithm to each segment.

In some embodiments, for an unorganized point cloud (either depth images or z-map data), a simple uniform parameterization may be used, since many 3D sensors' raw output can be organized into a set of 2D indexed 3D.

Adaptive Patch Generation

Some embodiments of the present disclosure are based on recognition that any T-spline surface can be converted to a set of independent B-spline or more simply Bézier surfaces, by using repeated knot insertion at each knot line until its multiplicity equals to the order of the underlying B-spline basis functions, i.e., d+1. When considering in the reverse procedure, we analyzed that why not adaptively divide the input points into smaller patches until each of them can be well represented by a simple B-spline with fixed knot vectors, or even by a Bézier patch? Once that is done, we only need to compose all such patches together into a single T-spline with proper continuity at the shared knot lines, i.e., boundary of each patch in the parameter domain.

This leads to our adaptive patch generation described in Algorithm 2 below. Based on our notation, for unorganized point clouds, Domain (F)≜[min$\{u_i\}$,max$\{u_i\}$]×[min$\{v_i\}$, max$\{v_i\}$]; for organized point clouds, Domain (F)≜[1, M]×[1, N]. It is uniformly split the entire input domain into several regions by the InitSplit function, to avoid unnecessary initial patch fitting. In our implementation, we always start with 4×4 blocks. According to another embodiment of the present disclosure, the entire input domain may be split according to a predetermined ratio of areas with respect to each region.

Algorithm 2 Generate Bezier Patches Adaptively

```
 1: function FITBEZIERPATCHADAPTIVE(F)
 2:     B ← ∅
 3:     R ← INITSPLIT(Domain(F))
 4:     for each r ≜ [u_min, u_max] × [v_min, v_max] ∈ R do
 5:         R ← R \ r
 6:         b ← FITBEZIERPATCH(r, F, d)
 7:         if b is ∅ then continue
 8:         if NEEDSPLIT(b) and CANSPLIT(r) then
 9:             {r_0, r_1} ← SPLIT(r)
10:             R ← R ∪ {r_0, r_1}
11:         else
12:             B ← B ∪ {b}
13:     return B
```

The FitBézierPatch function takes all data points within the domain r to fit a Bézier patch b defined on that r. This is done by solving the following equation using either standard QR or Cholesky factorization.

$$P^* = \arg\min_P \|BP - Q\|_F^2 + \lambda \|SP\|_F^2. \tag{2}$$

Here each row of P represents a Bézier control point. Input data points within region r are stored in each row of Q, and the (i,j) entry of the B matrix stores the j-th control point's Bézier basis function value evaluated at the parameter of the i-th data point in r.

It is noted that unlike fitting B-spline, there is no need to determine knot vectors for Bézier patches. Thus, B matrix only depends on size of the region r. Sometimes the FitBézierPatch function cannot perform the least squares fitting due to rank deficiency of B. This usually occurs at small regions with large detail variations, or regions with too many missing data. We either return an empty fit b and ignore the corresponding r, or add linear constraints S between control points with trade-off parameter $\lambda$ to make the above system rank sufficient. Example constraints can be either simply forcing neighboring control points to be close to each other, or more sophisticated ones to suppress wiggling fit.

The NeedSplit function can use different criteria to determine whether or not b is a bad fit and thus needs to be further split into smaller parts. If the input data is known to have the same isotropic error everywhere, then this function can check the $L^\infty$ fitting error with a prescribed threshold. Otherwise, for example, for Kinect data which is known to have depth-dependent errors, this function can check the fitting error with a dynamic depth-dependent threshold.

The CanSplit function tests whether a given domain r can be further split. In our implementation, for unorganized point clouds, it always returns true. For organized point clouds, if the split domains $r_0$ and $r_1$ could not have enough data inside for a valid Bézier fit, i.e., both $u_{max}-u_{min}+1$ and $v_{max}-v_{min}+1$ are smaller than 2d+1, then the domain r cannot be split. This is because after splitting, the resulted blocks will have less data points than control points, resulting in a rank deficient system unless we perform the constrained fitting in Eq. (2). It is worth to note the situation when a patch needs to be split but cannot be split. This usually happens at small blocks with too significant details that cannot be represented as a simple Bézier surface. There are two options to handle this situation: either perform B-spline refinement on that Bézier surface until the fitting error is small enough compared to a predetermined error, or simply discard this small part of data. As an example of implementation, we select the latter one because those tiny details are usually caused by sensor noise and ignoring them often would not hurt the final fitting result significantly.

The Split function can have different behaviors: split at the place with large Bézier fitting error, or split according to fitting error distribution. In our implementation, we always split in the middle of the longer side of the domain to avoid thin domains which do not tend to give good fitting results.

Local Knot Vector Interface

The output B of Algorithm 2, a set of Bézier patches, is essentially a valid T-spline already, with every knot line's multiplicity equals to the chosen order, d+1, of all the Bézier patches. However, it is more desirable to prescribe a surface parametric continuity to ensure smoothness across boundaries of patches. As previously mentioned, the boundaries of all returned patches in the parameter domain is treated as the recovered T-mesh for our T-spline fitting, which will remain fixed in the following steps. For example, in FIG. 2B, a simple T-mesh is generated from the three patches $b_1$, $b_2$, and $b_3$. However, the pre-image of the T-mesh, i.e., the T-mesh in the so-called index/parametric space, remains to be determined for inferring local knot vectors. This is because we can assign different multiplicity to each edge of the T-mesh, respecting both the prescribed parametric continuity of a desired surface model and the data continuity obtained from the input point cloud.

Algorithm 3 describes on infer local knot vectors. The first step is to build a face-edge-vertex represented mesh $T_{mesh}$ from boundaries of all the Bézier patches, using the function BuildMesh. The vertices of this Tmesh correspond to the corners of all patches. The edges of this $T_{mesh}$ correspond to the sides of all patches that do not contain any other in-between vertices. The faces of this $T_{mesh}$ correspond to all patches. This $T_{mesh}$ should also allow for the operation of shooting rays from a vertex $(u_2, v_2)$ to its up, down, left, and right directions to determine its local knot neighbors as [ ..., $u_1$, $u_2$, $u_3$, ... ] in the u-direction and [ ..., $v_1$, $v_2$, $v_3$, ... ] in the v-direction, as depicted in FIG. 2B.

After building such $T_{mesh}$, the FindEdgeMultiplicity function needs to go through each edge in the $T_{mesh}$, and examine the input data continuity between the two faces/patches lying on both sides of that edge. The examined result will then be stored in that edge. In our implementation, we detect data discontinuities between two patches, i.e., whether the two patches are disconnected to each other, using depth dependent thresholds. This often occurs in Kinectlike point clouds where object occlusion creates large depth differences between neighboring points. Without properly handling such discontinuities in a T-mesh, a resulting T-spline will have less representation power for fitting disconnected input points. Note that even if we use the pre-segmentation of the input point cloud, data discontinuities might remain in each segment; thus we still need to perform such detection to add knot multiplicity when inferring local knot vectors.

Finally, this algorithm goes through each vertex in the $T_{mesh}$, generates and stores a set of local knot vectors for control points associated with that vertex, using the GenLocalKnotVector function. This is done with the help of the above mentioned $T_{mesh}$ operation of finding a vertex's local knot neighbors. For example, in FIG. 2B, the dashed edge is marked as discontinuous since the input points are disconnected at this edge. Thus, if a C1 continuity is prescribed for the surface model to be fitted, the GenLocalKnotVector function will generate a T-mesh in the index/parametric space as FIG. 2C, from its source T-mesh in the parameter space as FIG. 2B. The same operation can be used to output 6 pairs of knot vectors for the vertex n, corresponding to the 6 junctions, or the so-called anchors, inside the blue dashed circle.

---
Algorithm 3 Infer Local Knot Vectors
---

1: function INFERLOCALKNOTVECTOR(B, $\mathcal{F}$)
2:     $T_{mesh}$ ← BUILDMESH(B)
3:     FINDEDGEMULTIPLICITY($T_{mesh}$, $\mathcal{F}$)
4:     U ← ∅, V ← ∅
5:     for each vertex n in $T_{mesh}$ do
6:         ($U_{tmp}$, $V_{tmp}$) ← GENLOCALKNOTVECTOR(n, $T_{mesh}$)
7:         U ← U ∪ $U_{tmp}$, V ← V ∪ $V_{tmp}$
8:     return (U, V, $T_{mesh}$)

---

Control Point Initialization and Refinement

In general, merely enforcing shared boundary control points in Bézier patch fitting does not result in an optimal T-spline surface in terms of either surface smoothness or fitting errors. Once a T-mesh is discovered with the set of local knot vectors (U, V) output from Algorithm 3, one has to build a sparse linear system for solving the best control point positions as $$C^* = \arg\min_C \|TC - Q\|_F^2, \quad (3)$$

where T is a MN×K matrix holding T-spline blending function values from Eq. (1) for each data point per row, Q is a MN×3 matrix holding each input data point per row of the same row order as T, and C is a K×3 matrix hold each unknown control points per row of the same column order as T (N=1 for unorganized point clouds).

If both the number of control points and the input data size are small, this sparse linear system can be solved using direct solvers such as Cholesky or QR decomposition. However, when the problem size is large, it is intractable to use direct solvers, and an iterative solver such as PCG or progressive fitting can be used. Thus, a good initialization is necessary to reduce the number of iterations for fast computation.

Algorithm 4 shows the function AssignRelevant-ControlPoint that can adopt to set each initial T-spline control point as its corresponding one in its associated Bézier patches B. FIG. 2C illustrates one such example, where the four dots show the anchors of those T-spline control points, and they are associated with the patch b3. After this heuristic initialization, the RefineControlPoints function uses an iterative solver to refine that initial guess. In our implementation, we chose PCG with the Jacobi preconditioner for such refinement.

---
Algorithm 4 Solve Control Points
---

1: function SOLVECONTROLPOINT(B, $T_{mesh}$, U, V, $\mathcal{F}$)
2:     $C_0$ ← 0
3:     for each b ∈ B do
4:         ASSIGNRELEVANTCONTROLPOINT(b, $C_0$, $T_{mesh}$)
5:     C ← REFINECONTROLPOINTS($C_0$, U, V, $\mathcal{F}$)
6:     return C

---

After obtaining a fitted T-spline surface via algorithms described above, the T-spline surface is displayed on a screen monitor of the display device 165 according to embodiments of the present disclosure. The data of the fitted T-spline surface can be transmitted to a display device or the other computers (outside the fast T-spline fitting system 100) via the network 155 including a WiFi network upon an input operation by a user or a data request from another computer or the other computers via the network 155.

Experimental Results

We evaluated our FasTFit algorithm's speed and accuracy over several datasets on two different applications: fitting T-spline to 3D point clouds and image data. We consider three kinds of organized 3D point clouds, Kinect-like and z-map-like organized point clouds, as well as unorganized point clouds. For Kinect point clouds, we used simple pre-segmentation based on Euclidean distance between points and applied our algorithm to each segment. We found this segment-based approach leads to a smaller number of control points, thus faster computation, than fitting a single T-spline for the entire point cloud. For image data, we fitted a single T-spline for the entire image. We implemented the algorithm in C++ with OpenMP parallelization and conducted all experiments on a standard desktop PC with Intel Core i7 CPU of 4.0 GHz.

Figure 4:
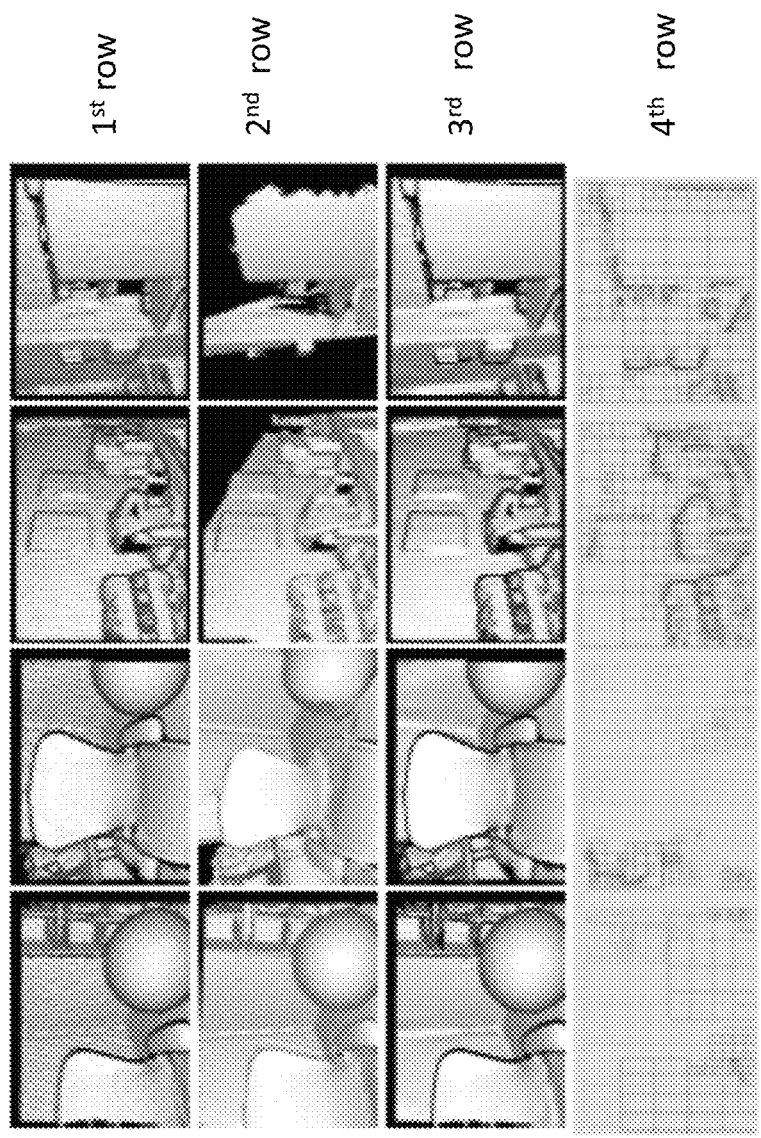
FIG. 4. shows qualitative comparisons between our algorithm and KinFu, an open-source implementation of Kinect Fusion for several different scenes.

FIG. 4. shows qualitative comparisons between our algorithm and KinFu, an open-source implementation of Kinect Fusion for several different scenes.

The first row indicates raw input point clouds. The second row indicates results obtained with KinFu by fusing multiple point clouds. Note that this requires accurate registration among the multiple frames, and the quality degrades if the registration is not accurate as in the second column. The third row indicates our results in accordance with an embodiment of the present disclosure by fitting C2 T-spline surfaces to different segments of the single input point cloud. the forth row indicates fitted T-meshes over point cloud segments shown in different colors. The surface reconstruction quality is comparable to that of KinFu assuming the accurate registration.

3D Point Clouds

The first application is fitting a T-spline surface over each single frame of 3D point clouds. We performed both quantitative and qualitative comparisons between our method with two relevant conventional methods.

Quantitative Comparison with Iterative Strategy

Subregional knot insertion (SKI) is one of T-spline fitting methods for organized input data that follows the iterative strategy. In each mesh refinement iteration, it uniformly divides the whole input data into a number of subregions (a set of patches). In other words, a partitioning process divides a parameterized domain uniformly into a set of patches. Further, in some cases, the portioning may divide non-uniformly into a number of subregions (a set of patches). The number of subregions increases quadratically with the iterations. Then a fixed percentage, termed insertion ratio α %, of the subregions with largest fitting root-mean-squared-error (RMSE) are selected. In other words, partitioning is performed based on a partitioning percentage (insertion ratio α %,) using the largest fitting RMSE. For instance, the partitioning percentage may be a knot insertion ratio in a range from 0.1% to 1%.

Subsequently for each selected subregion, a knot is inserted at the center of the T-mesh face that contains the data point with the largest fitting error inside that selected subregion. Finally, a progressive fitting algorithm, instead of PCG to optimize control point positions of this new T-spline.

We implemented the SKI strategy, with a %=0.1 for comparing Kinect point cloud fitting with our FasTFit strategy.

Note that we compare the iterative vs. non-iterative fitting strategies, instead of specific sparse linear system solving algorithms. In this experiment the linear system in Eq. (3) was solved by PCG for both SKI and FasTFit.

There are three critical statistics for this comparison: fitting time, RMSE, and the number of control points. They respectively represent the speed, quality, and model conciseness of a fitting strategy. We designed six fitting configurations: C31, SKI-C31CTRL, SKI-C31RMSE, C32, SKI-C32CTRL, SKI-C32RMSE. The C31 (3-degree spline with prescribed knot multiplicity of 1) and C32 (3-degree with knot multiplicity of 2) configurations use FasT-Fit with prescribed surface continuity of $C^2$ and $C^1$ respectively. All other configurations apply SKI to fit $C^2$ surfaces using different stopping conditions for SKI's mesh refinement iteration. SKI-C31CTRL stops its mesh refinement once the number of control points equals or exceeds that of our C31 fit while SKI-C31RMSE stops once the current fitting RMSE becomes equal to or smaller than that of our C31 fitting SKI-C32CTRL and SKI-C32RMSE are defined similarly with C32 fit's a number of control points and RMSE.

We collected more than 1200 frames of VGA-sized Kinect point clouds over typical indoor scenes, and performed the six fi experiments over these point clouds. The results are summarized in Table 1, from which one can observe the following advantages of FasTFit.

Fitting Speed

FasTFit runs at least 10 to 15 times faster than SKI. 370 The processing time for each step of FasTFit is shown in Table 2. Notice that segmentation time is not included in Table 1.

TABLE 1

Comparisons between SKI and FasTFit for VGA-sized Kinect point cloud fitting.

| Mean ± Std | Time (ms) | RMSE (mm) | #ctrl |
|---|---|---|---|
| Without FindKnotMultiplicity | | | |
| C31 | 561 ± 98 | 12.0 ± 5.0 | 1936 ± 692 |
| SKI-C31CTRL | 8883 ±4280 | 10.4 ± 4.1 | 1972 ± 706 |
| SKI-C31RMSE | 8179 ± 3723 | 11.1 ± 4.7 | 1954 ± 671 |
| With FindKnotMultiplicity | | | |
| C31 | 732 ± 574 | 9.1 ± 4.1 | 3254 ± 1223 |
| SKI-C31CTRL | 20845 ± 12325 | 8.1 ± 3.3 | 3280 ± 1232 |
| SKI-C31RMSE | 24721 ± 19923 | 8.5 ± 3.9 | 3514 ± 1518 |
| C32 | 710 ± 410 | 6.8 ± 3.0 | 6896 ± 2629 |
| SKI-C32CTRL | 90855 ± 68624 | 6.1 ± 2.8 | 6897 ± 2626 |
| SKI-C32RMS | 62709 ± 45291 | 6.6 ± 2.9 | 6039 ± 2248 |

TABLE 2

Processing time for each step of VGA-sized Kinect point cloud fitting.

| | Mean ± Std | Time (ms) |
|---|---|---|
| FasTFit | EuclideanSegmentation | 16.20 ± 0.9 |
| | FitBezierPatchAdaptive | 79.10 ± 24.7 |
| | InferLocalKnotVector | 11.75 ± 6.7 |
| | SolveControlPoint | 470.44 ± 87.3 |

Quality

When SKI is stopped at the same level of control point numbers, FasTFit results in comparable fitting RMSE (less than 0.2% difference in the RMSE of SKI-C31CTRL against C31 in Table 1). Due to knot insertion, SKI cannot stop at exactly the same number of control points in FasTFit, so SKI-C31CTRL's average number of control points is slightly larger than that of C31. Even under such condition, there are about 29% cases where C31 have smaller RMSE than SKI-C31CTRL.

Compactness

When SKI is stopped at the same level of RMSE, FasTFit almost always results in smaller number of control points, (comparing the number of control points of SKI-C31RMSE against C31 in Table 1). Similarly, SKI cannot stop at exactly the same RMSE in FasTFit, so SKI-C31RMSE's average RMSE is slightly smaller than that of C31.

Therefore, FasTFit more efficiently provides surface representations with quality and conciseness that are either comparable to or better than SKI. The advantage of FasTFit according to embodiments of the present disclosure is that it can efficiently discover a suitable T-mesh without time-consuming iterative mesh refinement, and the resulting T-spline is a satisfactory surface fit, as can be seen in the following qualitative comparisons. This feature provides improvement of computational function and reduces power consumptions with respect to computation tasks.

Qualitative Comparison

To evaluate the quality of surface fitting, in addition to SKI, we compare our results with those obtained by KinFu, an open-source implementation of Kinect Fusion that provides one of conventional surface reconstruction quality by fusing multiple point clouds in a truncated signed distance field (TSDF).

FIG. 4 shows the comparison, where we visualize all the results using the same shading pipeline implemented in KinFu Our algorithm provides high-quality surface reconstruction comparable with KinFu yet using only a single frame. Note also that our representation is compact, as shown in the T-mesh visualization in FIG. 4, compared to the TSDF representation with a fixed voxel resolution.

Z-Map/Point Clouds

Figures 5A, 5B:
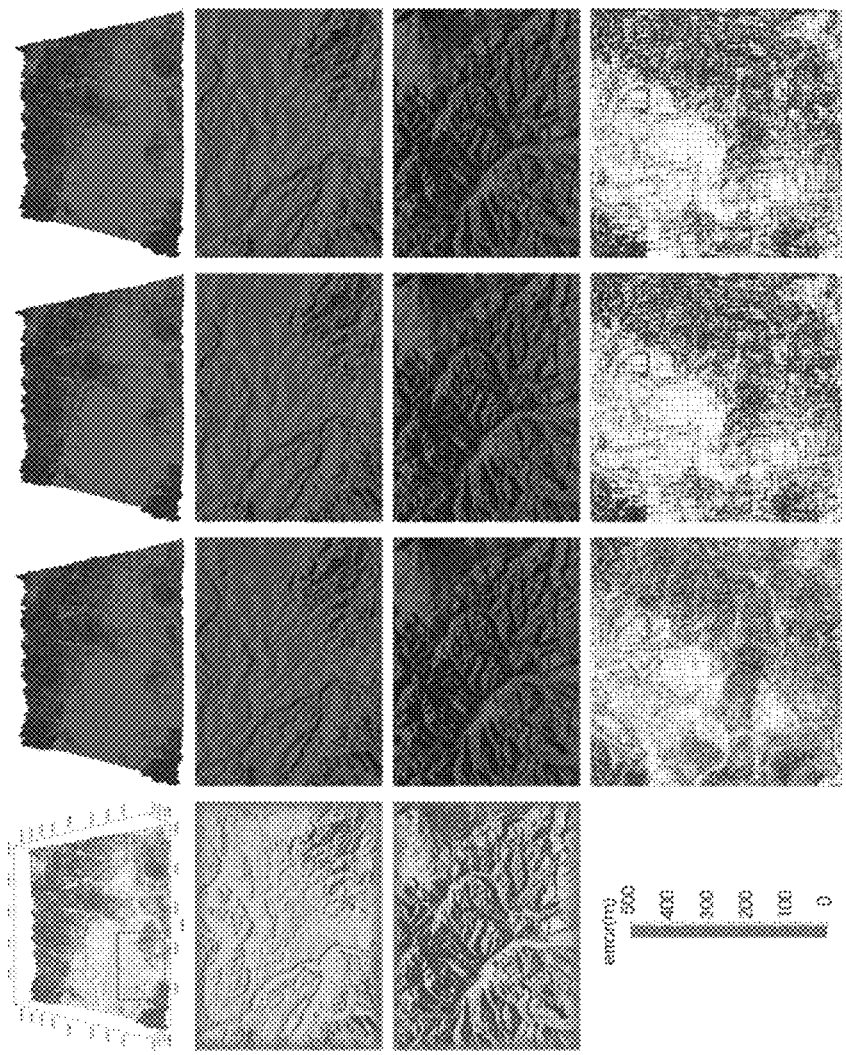
FIG. 5A and FIG. 5B show comparison between SKI method and FasTfit method according to an embodiment of the present disclosure.

FasTFit on z-map-like 3D point clouds is evaluated using a scaled version (1025×1025 pixels with inter-pixel spacing of 100m and pixel unit of 0.5m) of the well-known Puget Sound Terrain digital elevation map (DEM). FIG. 5A and FIG. 5B show comparison between SKI method and FasTfit method according to an embodiment of the present disclosure. Note that in this case the iterative strategy runs very much slower (four orders of magnitude) than FasTFit due to the significantly large number of control points, thus the computation cost of finding T-mesh faces containing largest RMSE regions, shape-preserving control point insertion, and maintaining T-mesh in each iteration further slows down SKI, i.e., the iterative strategy. Row 1 shows an overview. Row 2 and 3 illustrate detailed views. Row 4 shows legend and T-mesh. Meshes indicate fitting error. FIG. 5B is an experimental result indicating that FasTFit is four orders of magnitude faster and fits comparable surface comparing to the SKI method.

We also simulate a dataset of 41 different z-map point clouds (300×300 points in a 1×1×1.2 m³ region) generated from different random Bezier surfaces of degree ranging from 10 to 50. Based on this, we further simulate three datasets by adding missing data points, discontinuities, and isotropic Gaussian noise (0.003m standard deviation). The comparison with SKI method on these simulated datasets (164 point clouds in total) are shown in Table 3.

TABLE 3

Comparisons between SKI and FasTFit for simulated z-map fitting.

| Mean ± Std | Time (ms) | RMSE (mm) | #ctrl |
|---|---|---|---|
| Without FindKnotMultiplicity | | | |
| C31 | 87 ± 24 | 8.2 ± 3.2 | 246 ± 123 |
| SKI-C31CTRL | 1163 ± 444 | 7.2 ± 2.9 | 248 ± 123 |
| SKI-C31RMSE | 1169 ± 450 | 6.8 ± 2.9 | 269 ± 128 |
| With FindKnotMultiplicity | | | |
| C31 | 158 ± 69 | 6.9 ± 3.3 | 301 ± 176 |
| SKI-C31CTRL | 1192 ± 548 | 6.6 ± 2.8 | 304 ± 175 |
| SKI-C31RMSE | 3243 ± 9793 | 5.8 ± 2.8 | 592 ± 927 |

Figure 6A:
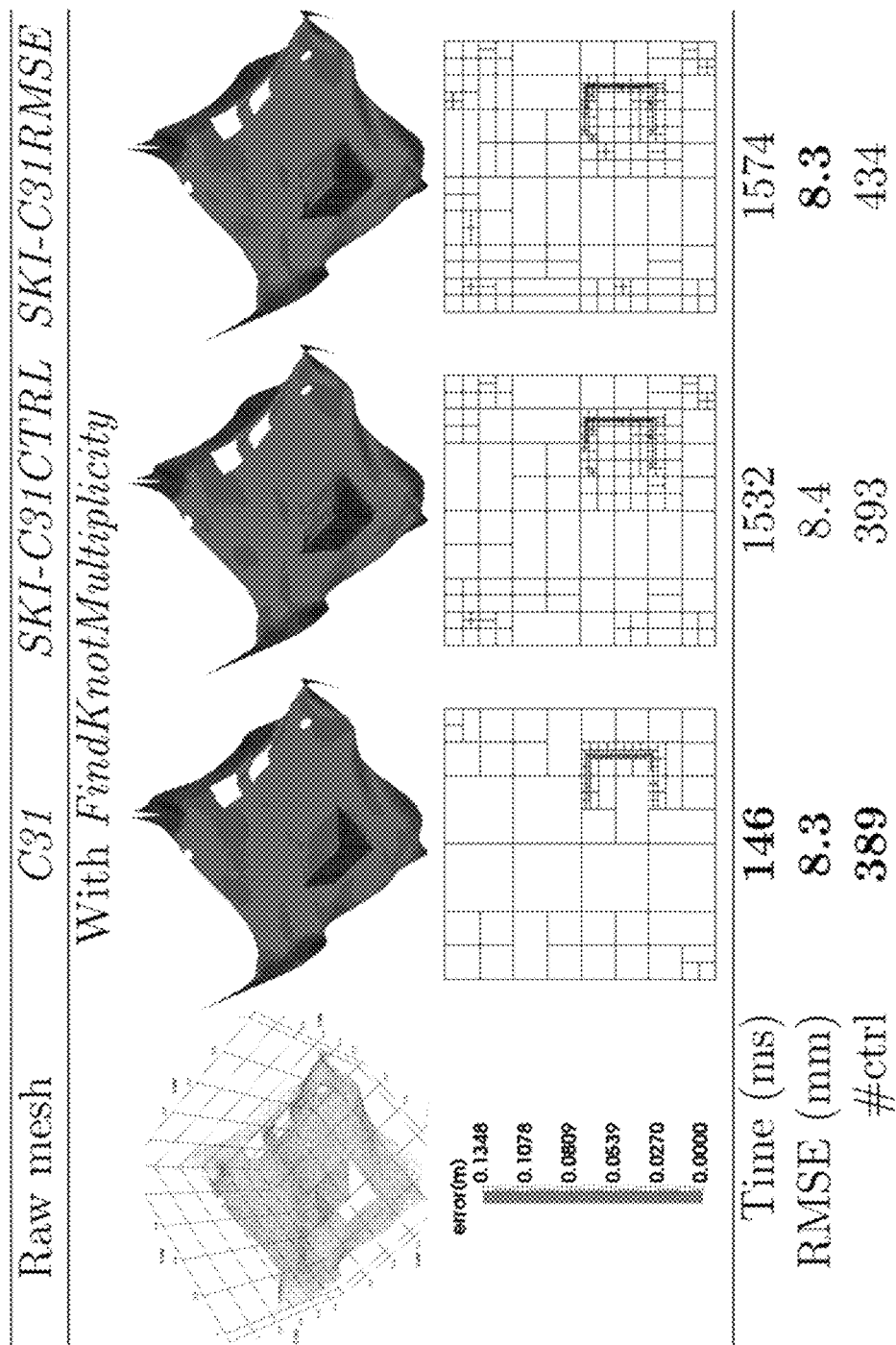
FIG. 6A shows fitting results obtained using FindKnot-Multiplicity algorithm.
Figure 6B:
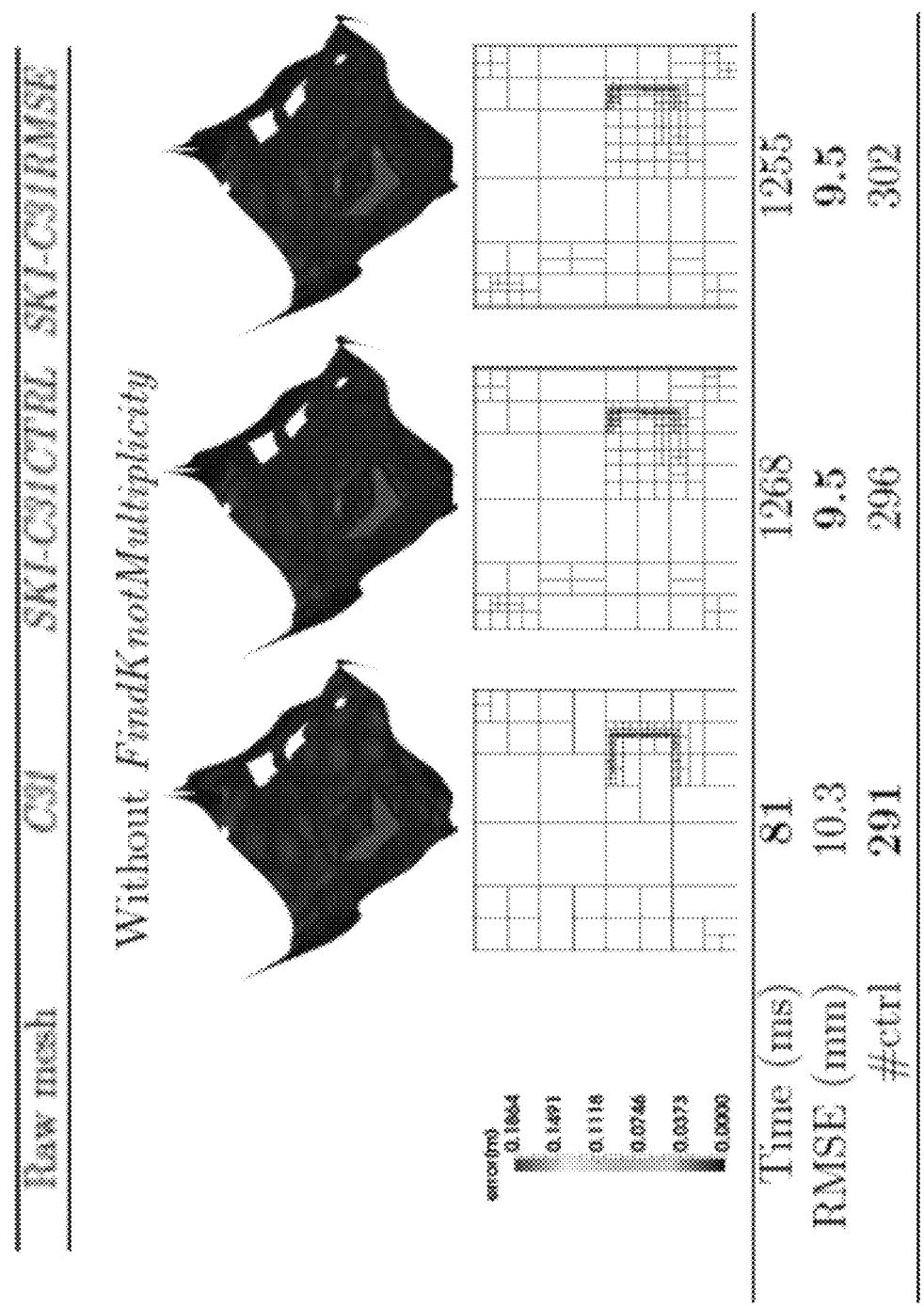
FIG. 6B shows fitting results obtained without using FindKnotMultiplicity algorithm.

FIG. 6A and FIG. 6B show typical fitting results, which demonstrate FasTFit's fitting efficiency and quality, and especially the benefit of respecting data discontinuities through FindKnotMultiplicity.

Unorganized Point Clouds

Figure 7:
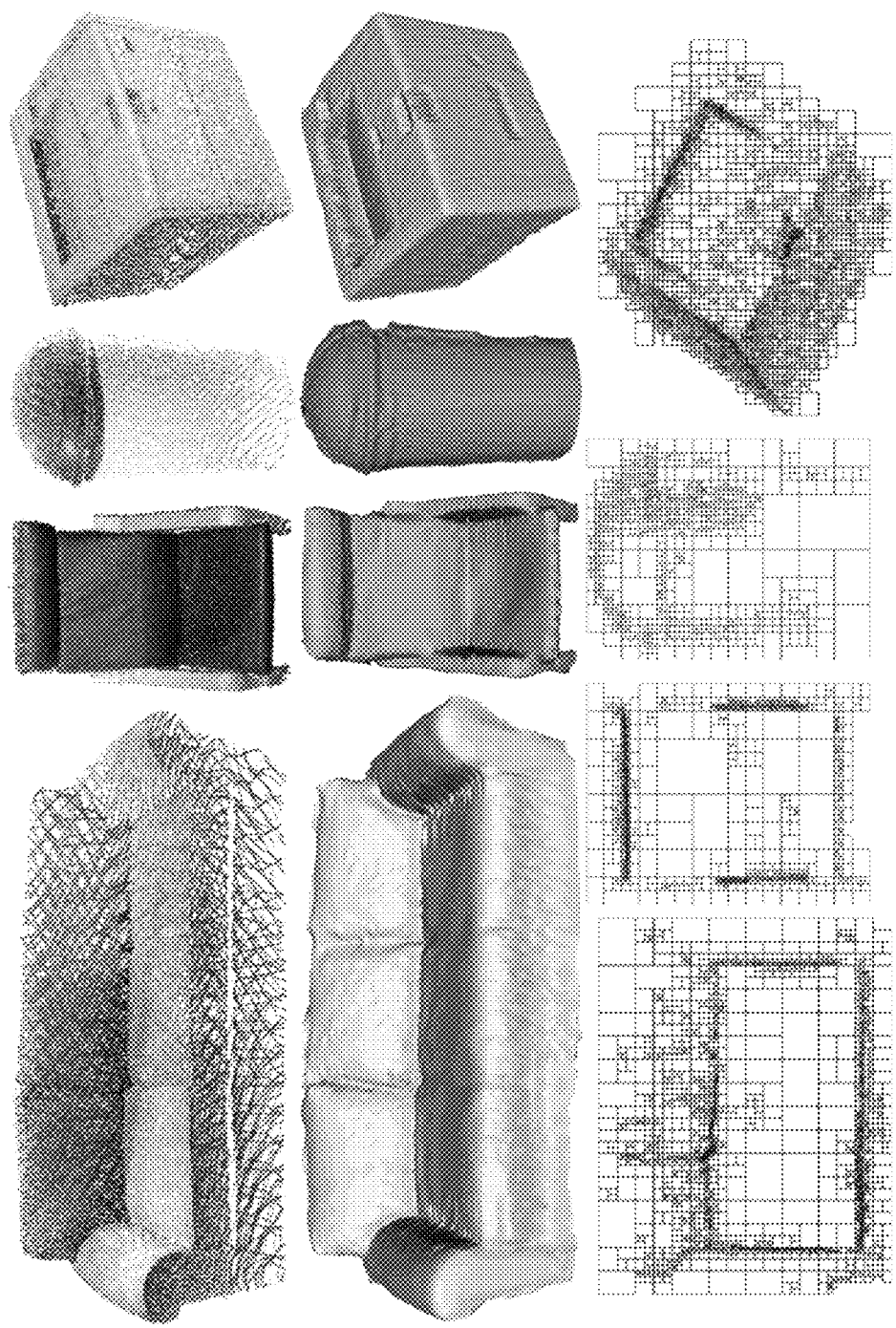
FIG. 7 shows examples of fitting unorganized point clouds.

We further evaluate FasTFit on unorganized 3D point clouds captured by registering multiple down sampled Kinect point clouds using a SLAM system. Here we manually segmented an object from the scanned scene, parameterized the object point cloud using a PCA-based method as described above, and _t a single T-spline surface. FIG. 7 shows examples of fitting unorganized point clouds, corresponding to raw points, fitted T-spline and T-mesh from the top to the bottom.

Image Data

The second application is fitting T-spline in RGB space for a color image, where the result could help various image process algorithms such as zooming and geometric transformations.

Figure 8:
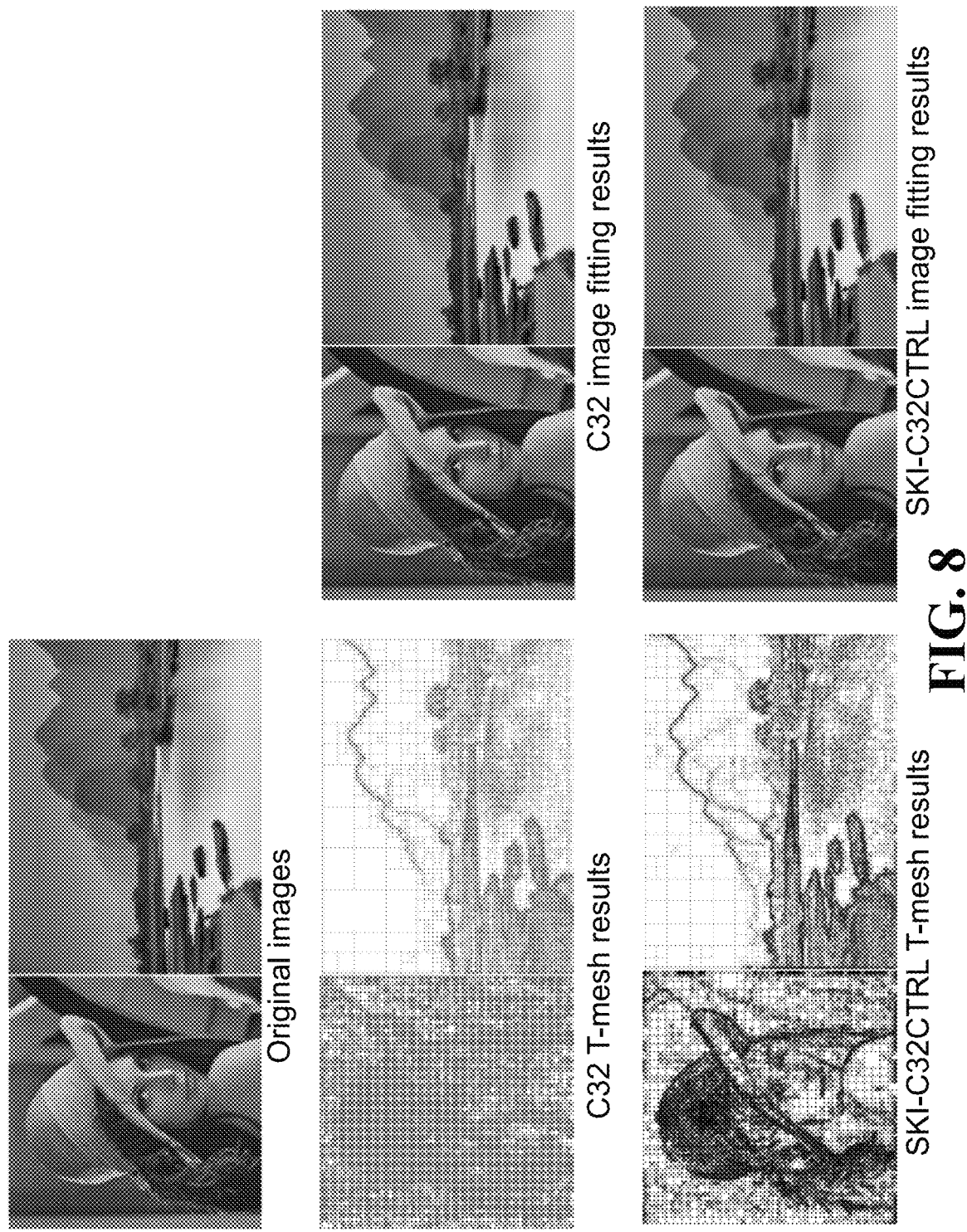
FIG. 8 shows two original images and C32 T-mesh results and SKI-C32CTRL T-mesh results with the corresponding image fitting results.

FIG. 8 shows two original images and C32 T-mesh results and SKI-C32CTRL T-mesh results with the corresponding image fitting results. The images are reconstructed from the fitting results and corresponding T-mesh. The differences between original images and fitted images from both FasT-Fit and SKI are hardly visible. See FIG. 8 showing the original images, the C32 image fitting results, and the SKI-C32CTRL image fitting results. Note that we did not apply shape-preserving control point insertion in this case in order to save time for SKI.

Table 4 shows the fitting statistics. In the Lena case, SKI-C31RMSE has the same result as SKI-C31CTRL since it reaches the max iterations before reducing the RMSE below SKI-C31CTRL and C31. In all cases, FasTFit is significantly faster than SKI while producing similar image reconstruction quality. Note that both our FasTFit and the original SKI implementation in use OpenMP for parallelization. Even though FasTFit's PSNR is slightly smaller than that of SKI, and sometimes FasTFit has much more control points, since images tend to have more data discontinuities than Kinect-like point clouds, and trade-offs have been made in FasTFit to favor computation speed.

TABLE 4

Comparisons between SKI and FasTFit for image fitting.

| | Time (s) | PSNR | #ctrl |
|---|---|---|---|
| Lena (512 × 512) | | | |
| C31 | 1.18 | 32.5276 | 30533 |
| SKI-C31CTRL | 1592.09 | 32.2693 | 23895 |
| SKI-C31RMSE | 1629.95 | 32.2693 | 23895 |

TABLE 4-continued

Comparisons between SKI and FasTFit for image fitting.

| | Time (s) | PSNR | #ctrl |
|---|---|---|---|
| Landscape (1600 × 1200) | | | |
| C31 | 6.07 | 37.2496 | 43038 |
| SKI-C31CTRL | 5388.24 | 36.9977 | 43039 |
| SKI-C31RMSE | 8799.40 | 37.6410 | 54145 |

As described above, a novel T-spline fitting strategy that can efficiently and accurately model large point clouds such as VGA-sized Kinect data. By adaptively dividing the input point cloud into smaller parts until each of them can be faithfully represented by an independent Bézier patch, a proper T-mesh is efficiently discovered without iterative knot refinement and control point adjustments. Then through different patch connection options that respect the surface continuity across patch boundaries revealed in the input data, the local knot vectors for all control points are inferred on the T-mesh. Through a heuristic initialization of all control points based on the fitted Bézier patches, a control point refinement can be performed efficiently, leading to our fitted T-spline model of the input point cloud. The results according to embodiments of the present disclosure show comparable or sometimes even better surface reconstruction on single frame Kinect point cloud data, compared with results generated by KinectFusion after fusing multiple frames.

The algorithm according to embodiments of the present disclosure can provide near real-time performance on VGA-sized Kinect data with less than 400 ms processing time on average. For the image data fitting, our algorithm achieved at least an order-of-magnitude faster processing time than the published state-of-the-art result. Such fast processing speed can benefit many downstream applications.

By shifting away from the conventional iterative fit-and-refine paradigm, we present a novel algorithm to more efficiently perform this task. Through adaptively dividing a point cloud into a set of B-spline patches, we first discover a proper topology of T-spline control points, i.e., the T-mesh. We then connect these B-spline patches into a single T-spline surface with different continuity between neighboring patches according to the data. The T-spline control points are heuristically initialized from their correspondences in the B-spline patches, which are refined by using a conjugate gradient method. Our experiments demonstrate that a CPU implementation of the proposed algorithm can efficiently fit a T-spline over a VGA-sized Kinect point cloud with a reasonable number of control points within 400 ms, which is at least two orders of magnitude faster than state-of-the-art algorithms. Therefore, the system and method for representing a point cloud of a scene using T-spline representation according to embodiments of the present disclosure can remarkably reduce the computational costs and improve data processing of images in a scene objects using a computer.

According to embodiments of the present disclosure, the algorithms of programs stored in a memory or a computer readable recording medium in connection with a processor can reduce control processing unit usage and power consumption of the processor.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as first, second, in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

We claim:

1. A system for representing a point cloud of a scene using T-spline representation comprising:
a three-dimensional (3D) sensor configured to acquire images of the scene;
a processor configured to communicate the 3D sensor and a memory storing a program for representing the point cloud of the scene using T-spline representation and execute instructions of the program, the instructions comprises steps of:
acquiring a depth image from a single frame of the scene using the 3D sensor;
generating the point cloud from the depth image of the single frame;
determining a parameterized domain of the point cloud by mapping data points of the point cloud generated from the single frame to values of parameters of the parameterized domain;
adaptive partitioning recursively, until a termination condition meets a threshold condition, the parameterized domain and the mapped data points of the point cloud generated from the single frame into a set of patches, wherein a current partitioning includes fitting a spline surface into a portion of the point cloud corresponding to a patch formed by a previous partitioning and partitioning the patch further, wherein the partitioning is performed based on a partitioning percentage of the patches using a largest fitting root-mean-squared-error (RMSE);
connecting the patches to form a T-mesh defining topology of control points in the parameterized domain; and
fitting a T-spline surface into the point cloud according to the T-mesh to determine positions of the control points.

2. The system of claim 1, wherein each of the patches is a rectangular sub-patch in the parameterized domain.

3. The system of claim 1, wherein the partitioning divides the parameterized domain either uniformly or non-uniformly into the set of patches.

4. The system of claim 1, wherein the threshold condition is a predetermined fitting error value for a spline fitted for data points in a patch.

5. The system of claim 4, wherein the threshold condition is a predetermined data size of the images.

6. The system of claim 1, wherein the instructions further comprises
transmitting data of the fitted T-spline surface to a display device or another computer.

7. The system of claim 1, further comprising
a display device configured to display the T-spline surface and T-mesh on a screen of the display device.

8. A method for representing a point cloud of a scene using T-spline representation using a processor in communication with a memory and a three-dimensional sensor comprising:
acquiring a depth image from a single frame of the scene using a 3D sensor;
generating the point cloud from the depth image of the single frame;
determining a parameterized domain of the point cloud by mapping data points of the point cloud generated from the single frame to values of parameters of the parameterized domain;
adaptive partitioning recursively, until a termination condition meets a threshold condition, the parameterized domain and the mapped data points of the point cloud generated from the single frame into a set of patches, wherein a current partitioning includes fitting a spline surface into a portion of the point cloud corresponding to a patch formed by a previous partitioning and partitioning the patch further, wherein the partitioning is performed based on a partitioning percentage of the patches using a largest fitting root-mean-squared-error (RMSE);
connecting the patches to form a T-mesh defining topology of control points in the parameterized domain; and
fitting a T-spline surface into the point cloud according to the T-mesh to determine positions of the control points.

9. The method of claim 8, wherein a fitting error of each of the patches is determined independently from fitting errors of other patches of the parameterized domain.

10. The method of claim 8, wherein the threshold condition is determined by an area of the portion.

11. The method of claim 8, wherein each of the patches is a rectangular sub-patch in the parameterized domain.

12. The method of claim 8, wherein the partitioning divides the parameterized domain either uniformly or non-uniformly into the set of patches.

13. The method of claim 8, wherein the threshold condition is a predetermined fitting error value.

14. The method of claim 8, wherein the threshold condition is a predetermined data size of the images.

15. The method of claim 8, wherein the partitioning percentage is a knot insertion ratio in a range from 0.1% to 1%.

16. The method of claim 8, further comprising:
transmitting data of the fitted T-spline surface to a display device or another computer.

17. The method of claim 16, further comprising:
displaying the T-spline surface and T-mesh on a screen of the display device.

18. A non-transitory computer readable recoding medium storing thereon program codes causing a processor to execute a method for representing a point cloud of a scene using T-spline representation, wherein the program codes comprising:
program code for acquiring a depth image from a single frame of the scene using a 3D sensor;
program code for generating the point cloud from the depth image of the single frame;
program code for determining a parameterized domain of the point cloud generated from the single frame by mapping data points of the point cloud to values of parameters of the parameterized domain;
program code for adaptive partitioning recursively, until a termination condition meets a threshold condition, the parameterized domain and the mapped data points of the point cloud generated from the single frame into a set of patches, wherein a current partitioning includes fitting a spline surface into a portion of the point cloud corresponding to a patch formed by a previous partitioning and partitioning the patch further, wherein the partitioning is performed based on a partitioning percentage of the patches using a largest fitting root-mean-squared-error (RMSE);
program code for connecting the patches to form a T-mesh defining topology of control points in the parameterized domain; and
program code for fitting a T-spline surface into the point cloud according to the T-mesh to determine positions of the control points.

19. The non-transitory computer readable recoding medium of claim 18, wherein a fitting error of each of the patches is determined independently from fitting errors of other patches of the parameterized domain.

* * * * *